United States Patent [19]
Murakami et al.

[11] Patent Number: 5,649,459
[45] Date of Patent: Jul. 22, 1997

[54] POWER TRANSFER SYSTEM FOR VEHICLE

[75] Inventors: Kazutoshi Murakami, Hamamatsu; Izumi Amemiya, Isehara, both of Japan

[73] Assignees: Nissan Motor Co., Ltd., Yokohama; Fuji Univance Corporation, Kosai, both of Japan

[21] Appl. No.: 528,496

[22] Filed: Sep. 14, 1995

[30] Foreign Application Priority Data

Sep. 21, 1994 [JP] Japan .................. 6-226614

[51] Int. Cl.⁶ .................................................. B60K 17/348
[52] U.S. Cl. .................................................. 74/665 GE
[58] Field of Search ...................... 74/665 G, 665 GE; 180/251

[56] References Cited

U.S. PATENT DOCUMENTS

| | | | |
|---|---|---|---|
| 4,040,309 | 8/1977 | Wood et al. | 74/665 GE |
| 4,984,663 | 1/1991 | Kato | 180/251 |

FOREIGN PATENT DOCUMENTS 7-186759  7/1995  Japan .

*Primary Examiner*—Dirk Wright
*Attorney, Agent, or Firm*—Foley & Lardner

[57] ABSTRACT

A power transfer system which distributes a power of the engine to front and rear wheels in a vehicle. The power transfer system comprises a first input shaft whose one end portion is in butt connection with an input shaft from an engine and whose other end portion is supported to a ball bearing fixed to a housing. A friction clutch is installed to the first input shaft such that the power to the first output shaft is transferred to a second output shaft through an endless chain according to the engagement of the friction clutch. A ring groove is formed at an outer peripheral portion of the first output shaft, and a ring member is installed to the ring groove so as to be in contact with a side surface of the ball bearing. Therefore, a thrust load applied to the first output shaft due to the operation of the friction clutch is securely received by the ball bearing through the ring member.

6 Claims, 8 Drawing Sheets

POWER TRANSFER SYSTEM FOR VEHICLE

BACKGROUND OF THE INVENTION

1. Field of the Invention

The present invention relates to improvements in a drive s power transfer system of a vehicle, and more particularly to improvements in a structure of an endless chain type power transfer system for a four wheel drive vehicle.

2. Description of the Related Art

Various transfer systems for distributing a drive power of an engine to front wheels and rear wheels have been disclosed and in practical use. Japanese Patent Provisional Publication No. H7-186759 discloses a typical power transfer system where an input shaft and a first output shaft are coaxially arranged in tandem. An end portion of the first output shaft is in but joint with the input shaft, and the other end portion of the first output shaft is supported to a housing through a ball bearing. A drive power from the input shaft to the first output shaft is distributed to a second output shaft through a friction clutch, a first sprocket, an endless chain, and a second sprocket. The distribution ratio of the drive power is determined according to the degree of the engagement of the friction clutch. During the operation of the friction clutch, a thrust load along an axial direction of the first input shaft is applied to the first input shaft and functions to bend the first input shaft. In this condition, a thrust bearing for receiving such thrust load tends to receive a local load such as an edge load. This requires a remarkable increase of the durability of the thrust bearing.

SUMMARY OF THE INVENTION

It is an object of the present invention to provide an improved structure of a power transfer system for a variable power distribution type vehicle, which largely improves the reliability of a thrust load receiving structure. A power transfer system for a vehicle according to the present invention comprises an input shaft which is connected to a drive power generating source. A first output shaft is coaxially arranged with the input shaft. An end portion of the first output shaft is in butt connection with the input shaft, and the other end portion of the first output shaft is rotatably supported to a housing through a ball bearing. A second output shaft is parallel with the first output shaft. An endless chain interconnects the first output shaft and the second output shaft. A multi-plate friction clutch is disposed between the first output shaft and the endless chain. The friction clutch variably changes the engagement between the first output shaft and the endless chain according to a clutch pressure to be supplied to the friction clutch. A reaction force transfer means is installed to the first output shaft and transfers a thrust load generated at the first output shaft by the operation of the friction clutch to the ball bearing.

With this arranged power transfer system, even when a thrust reaction force is inputted to the first output shaft by the operation of the friction clutch so that the thrust reaction force is transferred to the ball bearing through the reaction force transfer section means, the thrust reaction force is securely received by the ball bearing fixed with the housing.

DETAILED DESCRIPTION OF THE INVENTION

Hereinafter, an embodiment of a power transfer system according to the present invention will be discussed with reference to the drawings.

Figure 1:
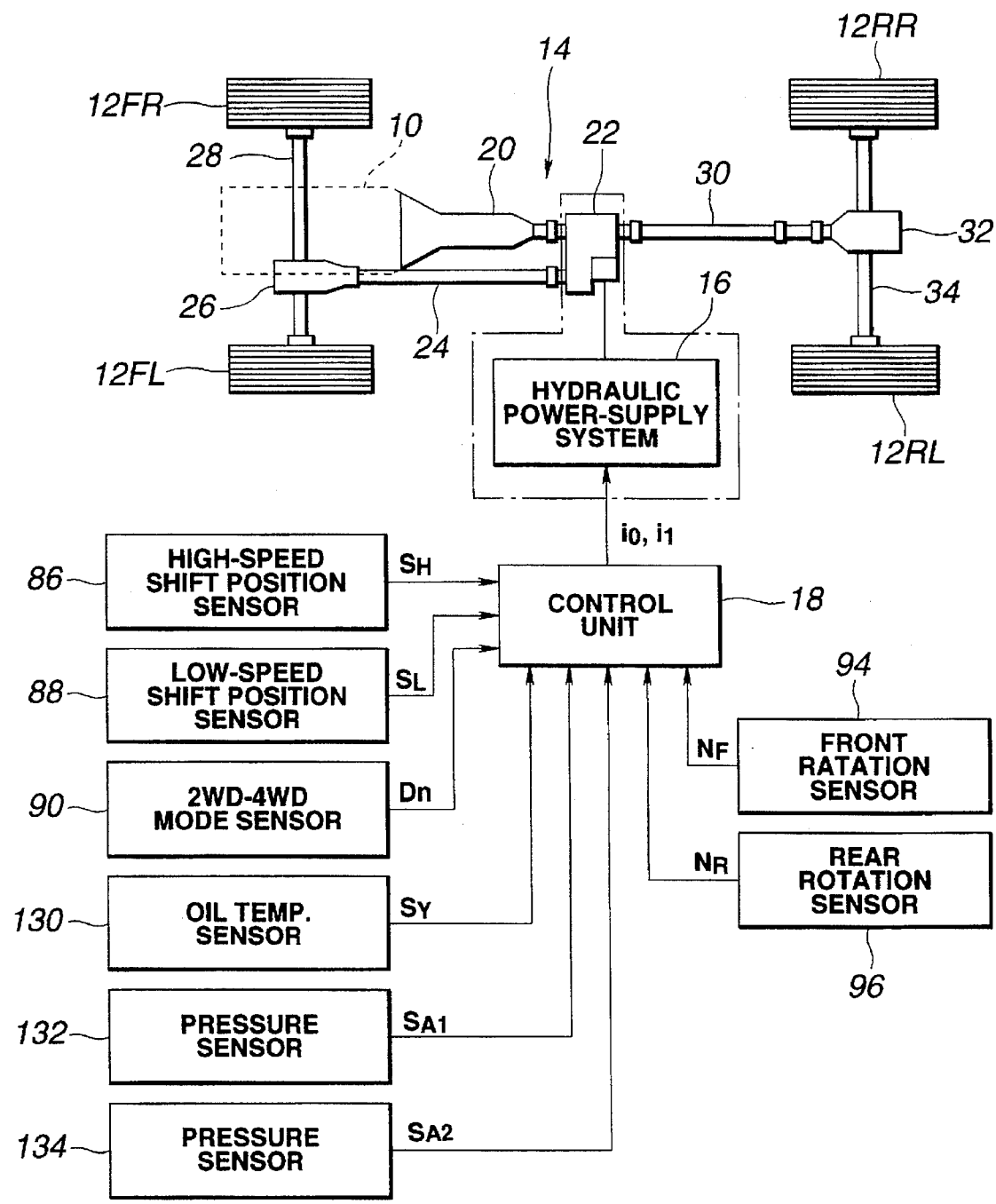
FIG. 1 is a schematic view of a four-wheel drive vehicle where a drive power transfer system according to the present invention is applied.

FIG. 1 shows a part-time four wheel drive (4WD) vehicle of a front-engine and rear-drive (FR) type. This vehicle comprises an engine 10, a pair of front wheels 12FR and 12FL, a pair of rear wheels 12RR and 12RL, a drive power transfer system 14 which variably changes the distribution ratio of drive power to the front wheels 12FR and 12FL and the rear wheels 12RR and 12RL, a hydraulic power supply system 16 which is operated to control the distribution ratio of the drive power transfer system 14, and a control unit 18 for controlling the hydraulic power supply system 16.

The drive power transfer system 14 is provided with a transmission 20 where the rotation speed of the drive power from the engine 10 is changed by a selected gear ratio, and a transfer 22 which distributes the drive power from the transmission 20 to the front wheels 12FL and 12FR and the rear wheels 12RR and 12RL. In the drive power transfer system 14, the distributed front drive power is transferred from the transfer 22 to the front wheels 12FR and 12FL through a front wheel output shaft 24, a front differential gear 26 and a front drive axle 28. Further, the distributed rear drive power is transferred from the transfer 22 to the rear wheels 12RR and 12RL through a propeller shaft (rear wheel output shaft) 30, a rear differential gear 32 and a rear drive axle 34.

A sensor group of this system includes a front side rotation sensor 94, a rear side rotation sensor 96, a high-speed shift position sensor 86, a low-speed shift position sensor 88, a 2WD–4WD mode sensor 90, an oil temperature sensor 130, a first pressure sensor 132 and a second pressure sensor 134. The control unit 18 receives the output signals from these sensors and controls the drive power distribution ratio by producing control signals $i_0$ and $i_1$ and sending them to the hydraulic pressure supply system 16.

Figure 2:
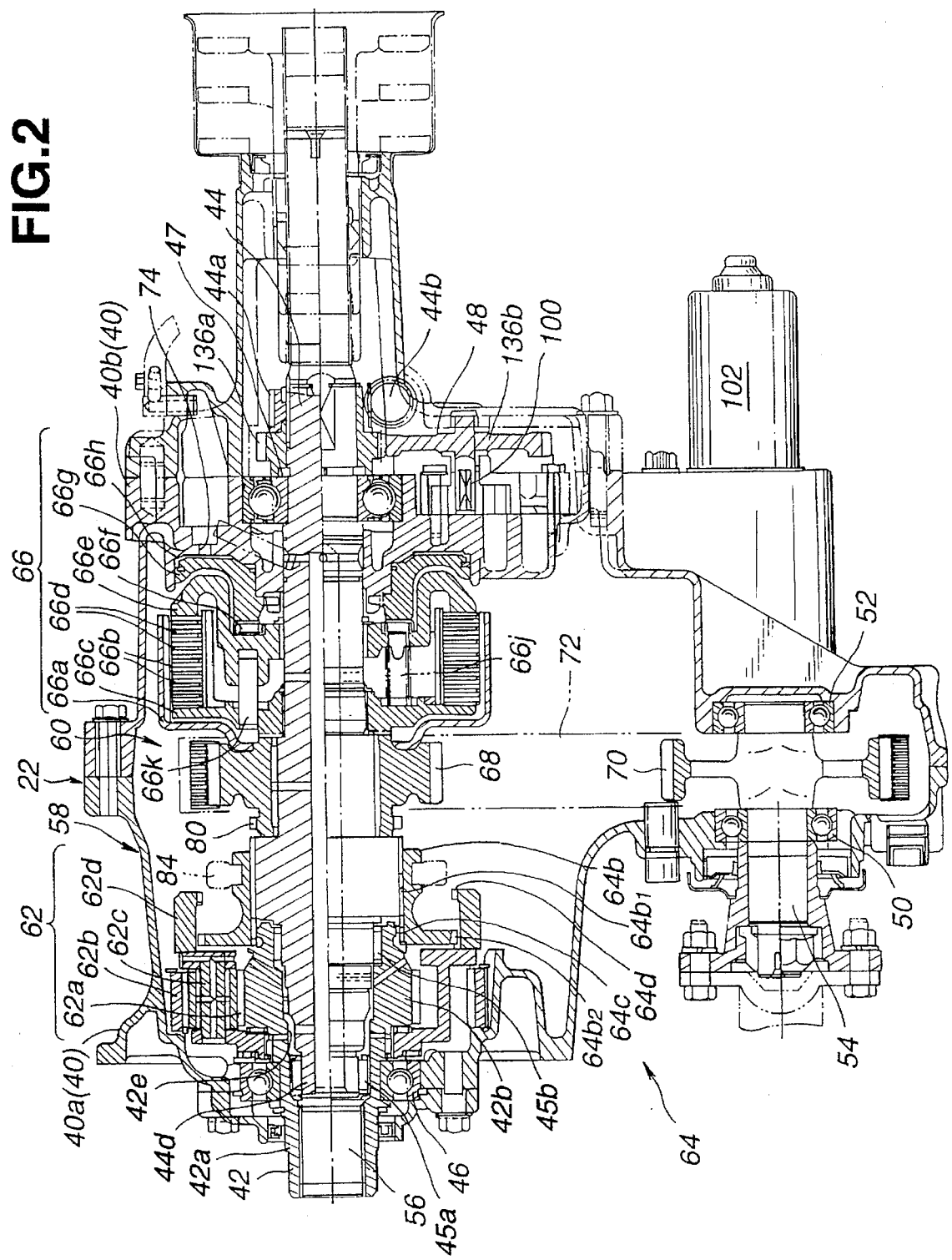
FIG. 2 is a sectional view of a transfer of the drive power transfer system according to the present invention.

FIG. 2 shows an inner structure of the transfer 22 where an input shaft 42 is coaxially connected with a butt joint with a first output shaft 44 in a transfer casing 40. The input shaft 42 is rotatably supported to a front casing 40a of the transfer casing 40 through a radial bearing 46. The first output shaft 44 is rotatably supported to a center casing 40b of the transfer casing 40 through a radial bearing 48. The input shaft 42 and the first output shaft 44 are rotatably arranged in tandem. A second output shaft 54 is rotatably supported to the front and center casing 40a and 40b through bearings 50 and 52, and is parallel with the input shaft 42 and the first output shaft 44. The input shaft 42 is connected with an output shaft 56 of the transmission 20. The first output shaft 44 is connected with the rear wheel output shaft 30. The second output shaft 54 is connected with the front wheel output shaft 24.

Figure 3:
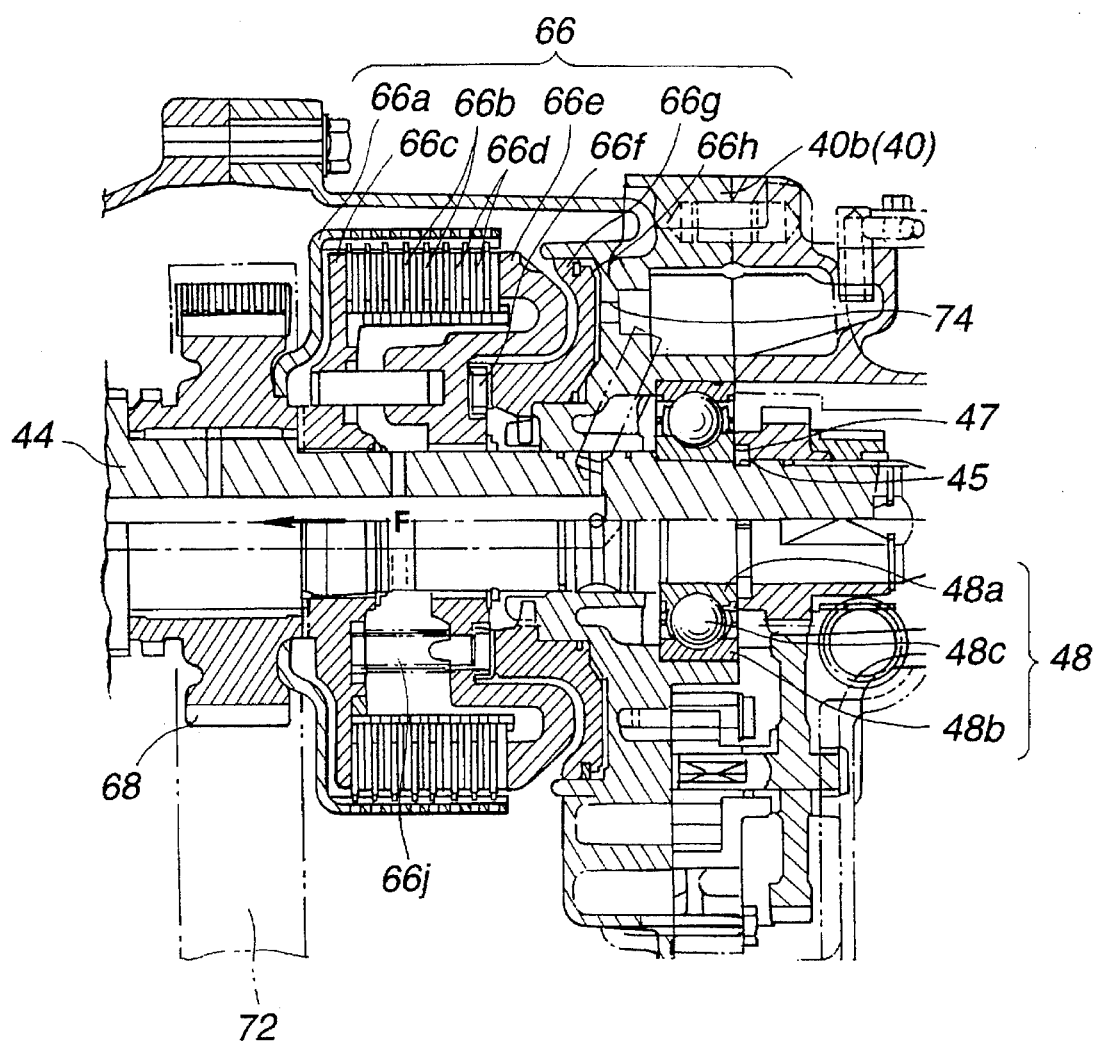
FIG. 3 is an enlarged partial view of the transfer of FIG. 2.

As shown in FIG. 3, the radial bearing (ball bearing) 48 is constituted by an inner race 48a engaged with the first output shaft 44, an outer race 48b engaged with an inner wall of the rear casing 40b and a plurality of ball bearings 48c disposed between the inner and outer races 48a and 48b.

A ring groove 45 is formed at an outer periphery of the first output shaft 44 adjacent to the ball bearing 48 and functions as a reaction force transfer section. A ring member 47 is inserted to the ring groove 45 so as to be in contact with a side surface of the inner race 48a of the ball bearing 48, and functions as a reaction force transfer section. More particularly, an inner circular portion of the ring member 47 is inserted into the ring groove 45 of the first input shaft 44, and most of an outer circular portion of the ring member 47 is fitted with a first gear 136b. Further, one flat side surface of the ring member 47 is in contact with the side surface of the inner race 48a of the ball bearing 48. That is, the reaction force of the thrust load applied to the first input shaft 44 is received by the ball bearing through the ring member 47 which functions to equivalently apply the reaction force of the thrust load to the ball bearing As shown in FIG. 2, an auxiliary shift mechanism 58 and a 2WD-4WD selector mechanism 60 are installed to the input shaft 42 and the first output shaft 44, respectively. The auxiliary shift mechanism 58 is constituted by a planetary gear mechanism 62 and a high-low speed selector mechanism 64. The high-low speed selector mechanism 64 is of an engage clutch type and is coaxially arranged with the planetary gear mechanism 62. The planetary gear mechanism 62 is constituted by a sun gear 62a formed at an outer periphery of the input shaft 42, an internal gear 62b fixed at an inner portion of the front casing 40a, a pinion gear 62c engaged with the sun gear 62a and the internal gear 62b, and a pinion carrier 62d rotatably supporting the pinion gear 62c.

The high-low speed selector mechanism 64 is constituted by a shift sleeve 64b, a high-speed shifting gear 64c and a low-speed shifting gear 64d. The shift sleeve 64b is provided with inner teeth 64b1 and outer teeth 64b2. The inner teeth 64b1 are splined with a plurality of key grooves of the first output shaft 44. The outer teeth 64b2 are engageable with the low-speed shifting gear 64d formed at an inner periphery of the pinion carrier 62d. The high-speed shifting gear 64c is disposed at an outer periphery of the input shaft 42 and is engageable with the inner teeth 64b1. The low-speed shifting gear 64d is disposed at an inner periphery of the pinion carrier 62d and is engageable with the outer teeth 64b2 of the shift sleeve 64b.

Figure 4:
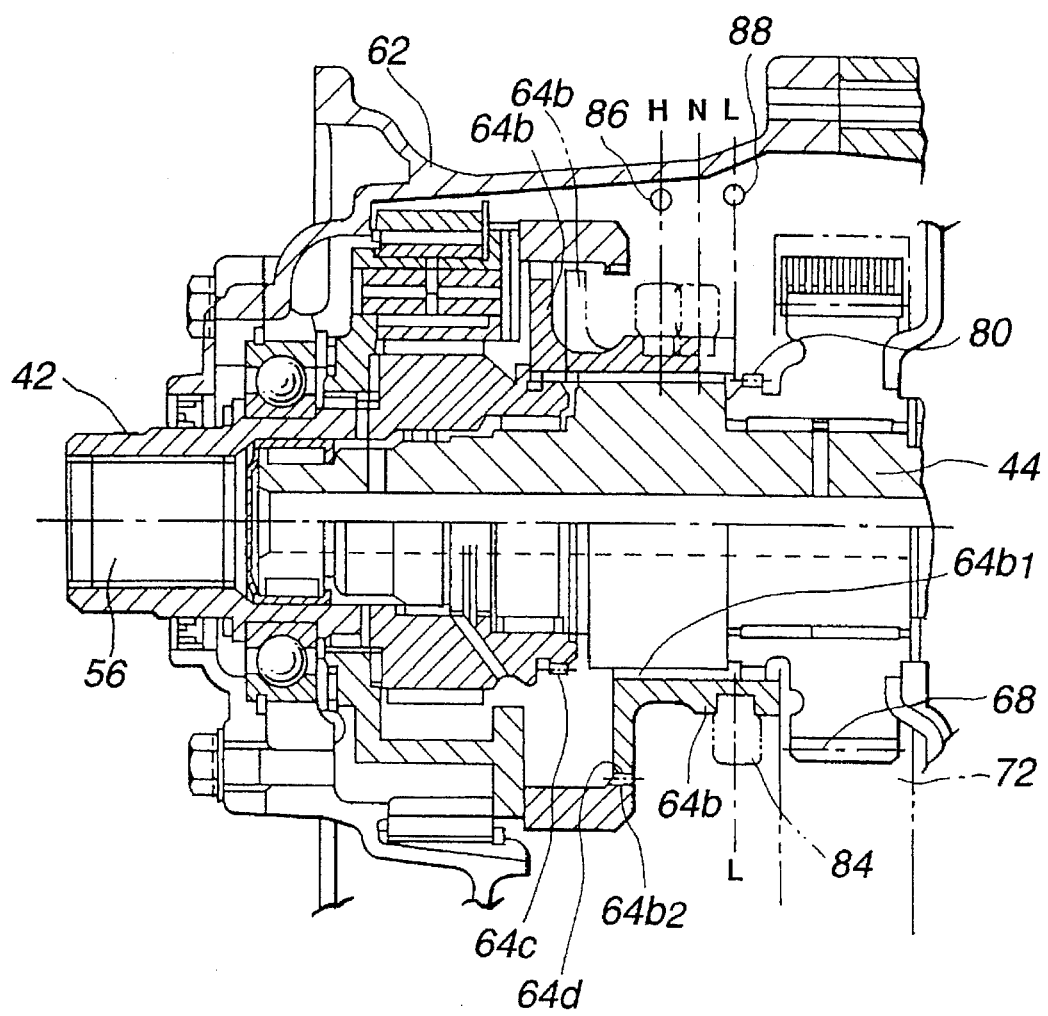
FIG. 4 is another enlarged partial view of the transfer of FIG. 2.

When the shift sleeve 64b is slid to a high-speed shift position designated by a reference character H as shown at an upper half portion in FIG. 4 by a continuous line, the high-speed shift gear 64c is engaged with the inner teeth 64b1. When the shift sleeve 64b is slid to a low-speed shift position designated by a reference character L as shown at a lower half portion in FIG. 4, the low-speed shift gear 64d is engaged with the outer teeth 64b2. Further, when the shift sleeve 64b is slid to a neutral position designated by a reference character N as shown at the upper half portion in FIG. 4 by a two-dots chain line, both of the inner teeth 64b1 and the outer teeth 64b2 are free from the high-low selector mechanism 64.

The 2WD-4WD selector mechanism 60 is constituted by a wet and multi-disc type friction clutch 66 for changing a distribution ratio of driver power to the front and rear wheels, a first sprocket 68 which is rotatably connected with the first output shaft 44, a second sprocket 70 which is axially connected to the second output shaft 54, and a chain which interconnects the first and second sprockets 68 and 70.

The friction clutch 66 is constituted by a clutch drum 66a, a friction plates 66b, a clutch hub 66c, a friction discs 66d, a rotation member 66e, a pin 66k, a thrust bearing 66f, a cylinder chamber 66h, and a return spring 66j. The clutch drum 66a is connected with the first sprocket 68 and is splined with the friction plates 66b. The clutch hub 66c is splined with the first output shaft 44. The friction discs 66d are integrally connected with the clutch hub 66c and are alternately disposed between the friction plates 66b. The rotation member 66e is disposed at an outer periphery of the first output shaft 44 and functions to connect the friction plates 66b and the friction discs 66d by its axial movement toward the clutch drum 66a. The pin 66k is integrally connected with the clutch hub 66c and interconnects the rotation member 66e with the clutch hub 66c. The clutch piston 66g is installed at an inner wall of the center casing 40b so as to be axially movable. The thrust bearing 66f transfers the axial movement of the clutch piston 66g to the rotation member 66e. The cylinder chamber 66h is formed between the clutch piston 66g and the inner wall of the center casing 40b. The return spring 66j applies a biasing force directing toward the clutch piston 66g to the rotation member 66e.

An input port 74 is formed at the center casing 40b so that a hydraulic pressure is supplied to the cylinder chamber 66h. When a clutch pressure Pc is supplied from the hydraulic power supply system 16 to the cylinder chamber 66h, the clutch piston 66g is moved in the left hand side in FIG. 2 due to the pushing force generated in the cylinder chamber 66h. By this movement of the clutch piston 66g, the friction plates 66b and the friction discs 66d are in contact with each other and generate an engagement force according to the clutch pressure Pc. Accordingly, a distribution ratio of the drive power is determined in correspond to the engagement force of the friction clutch 66, and a part of the rotational drive power of the first output shaft 44 is transferred to the second output shaft 54 through the first sprocket 68, an endless chain 72 and the second sprocket 70 according to the determined engagement force.

When the clutch pressure Pc is lowered and therefore the rotation member 66e and the clutch piston 66g are moved due to the biasing force of the return spring 66j in the right hand direction of FIG. 2, the friction plates 66b and the friction discs 66d are disengaged. Accordingly, the rotational drive power of the first output shaft 44 is not transferred to the second output shaft 54.

The first sprocket 68 is provided with a 4WD operation gear 80 at an outer periphery of a left hand side in FIG. 2 of the first sprocket 68. When the shift sleeve 64b is slid to the low-speed position L of FIG. 4, the outer teeth 64b2 is engaged with the low-speed shift gear 64d, and simultaneously the 4WD operation gear 80 is engaged with the inner teeth 64b1. By this engagement, the shift sleeve 64b and the 4WD operation gear 80 achieve a dog-clutch engagement between the first and second output shaft 44 and 54 so that the drive force of the first output shaft 44 is directly transferred to the second output shaft 54.

Practically, the shift sleeve 64b of the high-low speed selector mechanism 64 of a dog-clutch type is manually slid from the high-speed position H, neutral position N, or low-speed position L through a fork 84 by a manual operation of the auxiliary transfer lever (not shown).

The high-speed shift position sensor 86 detects that the shift sleeve 64b is slid to the high-speed shift position H, and the low-speed shift position sensor 88 detects that the shift sleeve 64b is slid to the low-speed shift position L in the front casing 40a. The high-speed shift position sensor 86 outputs a signal SH indicative that the shift sleeve 64b is set at the high-speed shift position H to a control unit 18. Similarly, the low-speed shift position sensor 88 outputs a signal SL indicative that the shift sleeve 64b is set at the low-speed shift position L to the control unit 18. The front and rear side rotation sensors 94 and 96 are associated with the front and rear drive shafts 24 and 30, respectively. Each of the front and rear side rotation sensors 94 and 96 optically or electomagnetically senses the number of the revolutions of the associated drive shaft 24 or 30 per unit time, and produces a pulse signal or sinusoidal signal indicative of a front or rear wheel speed NF or NR. In determining a wheel speed from a wheel rpm, a tire diameter is involved as a parameter, and accordingly the determined wheel speed can deviate from the actual wheel speed when the diameter of an actual tire is different from the initially set tire diameter.

Figure 5:
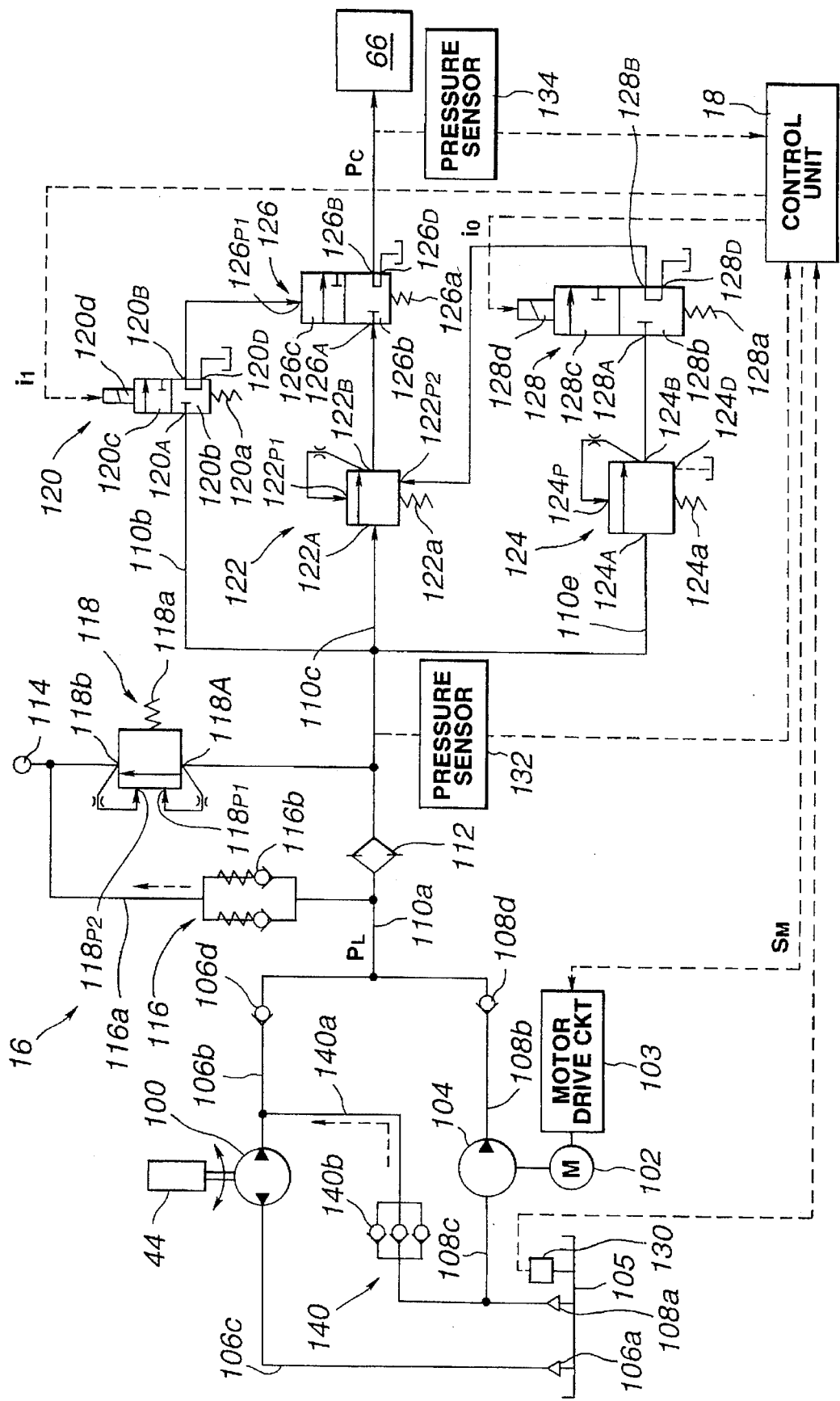
FIG. 5 is a hydraulic circuit diagram of a hydraulic control system for the drive power transfer system according to the present invention.

The hydraulic power supply system 16 is arranged to supply the predetermined clutch pressure Pc to the input port 74 of the transfer 22 as shown in FIG. 5. The hydraulic power supply system 16 is provided with a main pump 100 of a reversible rotation type which is directly connected with the first output shaft 44 and an auxiliary pump 104 which is arranged parallel with the main pump 100 and driven by an auxiliary motor 102 of an electric motor, as a hydraulic power source.

The main and auxiliary pumps 100 and 104 draw the operation oil in an oil tank 105 through strainers 106a and 108a and discharge it to conduits 106b and 108b. The conduits 106b and 108b are connected to a combined conduit 110a to which an oil element 112 is connected. A relief passage 116 is connected to the combined conduit 110a at an upstream side of the oil element 112. A line pressure control valve 118 is connected to the combined conduit 110a at a downstream side of the oil element 112. Conduits 110b, 110c and 110e are branched from the combined conduit 110a and are connected to an electromagnetic valve 120, a clutch pressure control valve 122 and a pressure regulator valve 124, respectively. An output of the clutch pressure control valve 122 is connected to an input of a pilot pressure selector valve 126 which supplies the clutch pressure Pc to the transfer 22 when the pilot pressure selector valve 126 receives a pilot pressure from the electromagnetic selector valve 120. An output of the pressure regulator valve 124 is connected to an input of a duty control electromagnetic valve 128. An oil temperature sensor 130 is installed in an oil tank 105 to detect a temperature of the operation oil. A first oil pressure sensor 132 is installed in the combined conduit 110a between the line pressure control valve 118 and the branch portion of the conduits 110b, 110c and 110e to detect a controlled pressure by the line pressure control valve 118. A second oil pressure sensor 134 is installed between the pilot selector valve 126 and the input port 74 to detect the clutch pressure Pc outputted from the pilot selector valve 126. The first and second oil pressure switches 132 and 134 output a signal indicative that a controlled pressure is detected and a signal indicative that the clutch pressure Pc is detected, respectively to the control unit 18. This hydraulic power supply system 16 is installed in the transfer 22. As shown in FIG. 2, the main pump 100 is interconnected to the first output shaft 44, and the auxiliary pump 104 is interconnected to the electric motor 102 attached to the rear casing 40b.

Next, with reference to FIG. 5, the parts of the hydraulic power supply system 16 will be discussed in detail.

The main pump 100 draws the operation oil from the oil tank 105 through the strainer 106a connected to an end of an intake conduit 106c. The auxiliary pump 104 draws the operation oil from the oil tank 105 through the strainer 108a connected to an end of an intake conduit 108c. A discharge conduit 106b connects the main pump 100 and the combined conduit 110a. A one-way value 106d is installed in the discharge conduit 106b, and a bypass passage 140 is connected to the discharge conduit 106b between the main pump 100 and the one-way valve 106d. A discharge conduit 108b connects the auxiliary pump 104 and the combined conduit 110a. A one-way valve 108d is installed in the discharge conduit 108b. The bypass passage 140 is constituted by a bypass conduit 140a and a triple one-way valve 140b installed in the bypass conduit 140a. When the first discharge conduit 106b is put in a negative pressure condition, the triple one-way valve 140b is opened to flow the operation oil in the direction designated by a broken-line arrow in FIG. 5.

A relief passage 116 is constituted by a relief conduit 116a whose one end is connected to a lubricating system 114 and a twin one-way valve 116b with spring which is installed in the relief conduit 116a. When the pressure at an upstream side of the oil element 112 becomes larger than a predetermined value due to the blinding of a filter of the oil element 112, the twin one-way valve 116b is opened to flow the operation oil in the direction designated by a broken-line arrow.

The line pressure control valve 118 is a pressure reducing valve of an internal pilot operating type (spring type). The line pressure control valve 118 is provided with a cylinder valve housing which includes an input port 118A connected to the combined conduit 110a, an output port 118b connected to the lubricating system 114 and a primary internal pilot port 118P1 for supplying a primary pressure through a fixed orifice and a secondary internal pilot port 118P2 for supplying a secondary pressure through a fixed orifice. A spool is slidably disposed in the cylindrical valve housing and is biased by a return spring 118a. A supply pressure PL pressurized by the main pump 100 or auxiliary pump 104 is regulated at a predetermined pressure value by the line pressure control valve 118 and supplies to the electromagnetic selector valve 120, the clutch pressure control valve 122 and the pressure reducing valve 124. The operation oil flowed out from the output port 118b during the reduced pressure setting is returned to the lubricating system 114.

The clutch pressure control valve 122 is a pressure control valve of an internal and external pilot operating type and a spring type. The clutch pressure control valve 122 is provided with a cylindrical valve housing which includes an input port 122A connected to the conduit 110c, an output port 122B connected to the pilot selector valve 126, an internal pilot port 122P1 for supplying a secondary pressure through a fixed orifice as a pilot pressure and an external pilot port 122P2 for supplying a controlled pressure from the duty ratio control electromagnetic valve 128. A spool is slidably disposed in the cylindrical valve housing and is biased by a return spring 122a. When the duty control valve 128 does not supply a control pressure, a communication passage between the input port 122A and the output port 122B is closed and therefore the clutch pressure control valve 122 does not output a secondary pressure. On the other hand, when the pilot control pressure is supplied from the duty control valve 128, the spool is moved to output the secondary pressure from the output port 122B as a clutch pressure Pc according to the pilot control pressure.

The pressure reducing valve 124 is of a secondary pressure keeping type and an internal pilot operating and spring operating type. The pressure reducing valve 124 is provided with a cylindrical valve housing which includes an input port 124A connected to a conduit 110e, an output port 124B connected to the duty control electromagnetic valve 128, an internal pilot port for supplying a secondary pressure from the output port 124B through a fixed orifice as a pilot pressure, and a drain port 124D. A spool is slidably disposed in the cylindrical valve housing and biased by a return spring 124a. When the spool is slid to a predetermined position by the pilot pressure from the internal pilot port 124P, a primary pressure from the input port 124A is lowered at a predetermined value and is supplied to the duty control electromagnetic valve 128 as a control pressure.

The duty control electromagnetic valve 128 is a 3-port and 2-position type and is provided with a cylindrical valve housing which includes an input port 128A connected to the pressure reducing valve 124, a drain port 128D connected to a drain side, an output port 128B connected to an external pilot port 122P2 of the clutch pressure control valve 122. A spool is slidably disposed in the valve housing and is biased by a return spring 128a. The spool takes a normal position 128b where the output port 128B and the drain port 128D are communicated, and an operating position 128c where the input port 128A and the output port 128B are communicated. When an exiting current $i_0$ corresponding to a desired duty ratio is supplied from the control unit 18 to the solenoid 128d, during on-time periods of the exciting current $i_0$, the spool is moved from the normal position 128b to the operating position 128c against the biasing force of the return spring 128a so that a pilot control pressure corresponding to the duty ratio is outputted to the clutch pressure control valve 122. Therefore, when the control pressure is supplied from the duty control electromagnetic valve 128 to the external pilot port 122P2, the clutch pressure Pc corresponding to the pilot control pressure is supplied to the input port 74 of the transfer 22, so that the engagement power of the friction clutch 66 is controlled according to the clutch pressure Pc to distribute the corresponding drive power to the front wheels 12FR and 12FL.

Figure 6:
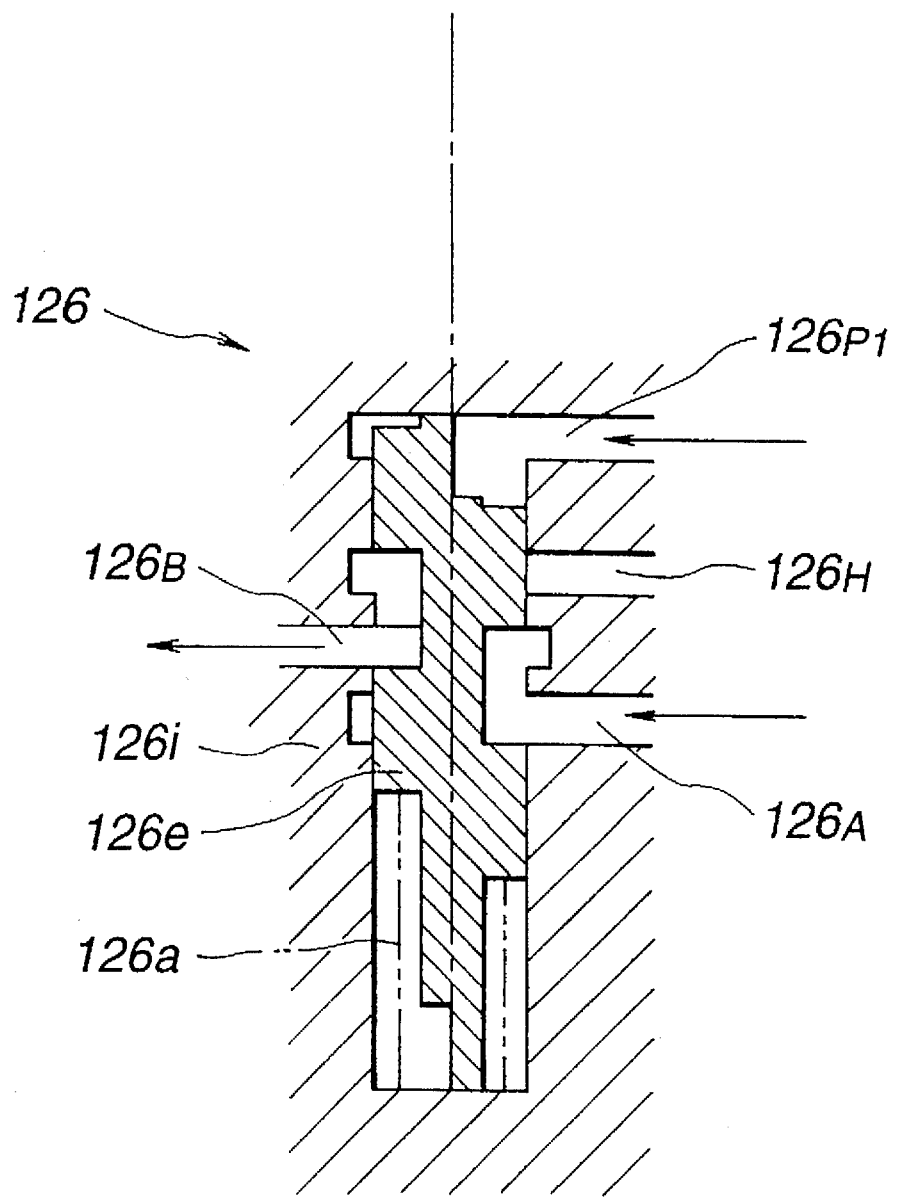
FIG. 6 is a sectional view of a selector valve applied to the hydraulic control system.

The electromagnetic selector valve 120 is of a spring offset type and of a 3-port and 2-position type. The electromagnetic selector valve 120 is provided with a valve housing which includes an input port 120A for supplying the line pressure, an output port 120B connected to the external pilot port 126P1 of the pilot selector valve 126, and a drain valve 120D. A spool in the valve housing takes a normal position 120b where the input port 120A is closed and the output port 120B and the drain port 120D are communicated, and an operating position 120c where the input port 120A and the output port 120B are communicated and the drain port 120D is closed. When the solenoid 120d of the electromagnetic selector valve 120 receives an exciting current $i_1$ from the control unit 18, the electromagnetic selector valve (on-off valve) 120 is set in the operating position so that the pilot control pressure is supplied to the external pilot port 126P1 of the pilot selector valve 126. When the control unit 18 stops to supply the exciting current $i_1$ to the solenoid 120d, the spool is returned to the normal position 120b by the biasing force of the return spring 120a so that the pilot control pressure is drained to the drain port 120D. The pilot selector valve 126, as shown in FIG. 6, is provided with a cylindrical valve housing 126i which includes an input port 126A for receiving the secondary pressure from the clutch pressure control valve 122, an output port 126B for supplying the secondary pressure to the transfer 22, an external pilot port 126P1 which receives a control pressure when a solenoid 120d of the electromagnetic selector valve 120 is turned on, and a drain port 126D. A spool 126e is slidably disposed in the valve housing 126i and is biased to one end by a return spring 126a.

When the pilot pressure is not supplied to the external pilot port 126P1, the spool 126e is set at a 2WD mode position where the output port 126B is not communicated with the input port 126A and is communicated with the drain port 126H, as shown by a left hand side spool condition in FIG. 6. When the solenoid 120d of the electromagnetic selector valve 120 is turned on, the electromagnetic selector valve supplies the control pressure to the external pilot port 126P1. This sets the pilot selector valve 126 in a 4WD mode position 126c so as to communicate the input port 126A and the output port 126B as shown by a right hand side spool condition in FIG. 6.

Thus, since the pilot selector valve 126 is driven so that the spool 126e is moved by the pilot control pressure of high pressure from the electromagnetic selector valve 120, the spool 126e is securely operated even if some dusts prevent the movement of the spool 126e.

The control unit 18 is arranged to output the exciting currents $i_0$ and $i_1$ to the hydraulic power supply system 16 according to the detection signals from the high-speed shift position sensor 86, the low-speed shift position sensor 88 and the 2WD-4WD mode sensor 90. The control unit 18 also controls so that the hydraulic power supply system 16 can keep a predetermined hydraulic pressure. More particularly, the control unit 18 receives the detection signals form the oil temperature sensor 130 and the oil pressure sensors 132 and 134 installed in the hydraulic power supply system 16 and output a control signal to the hydraulic power supply system 16.

Figure 7:
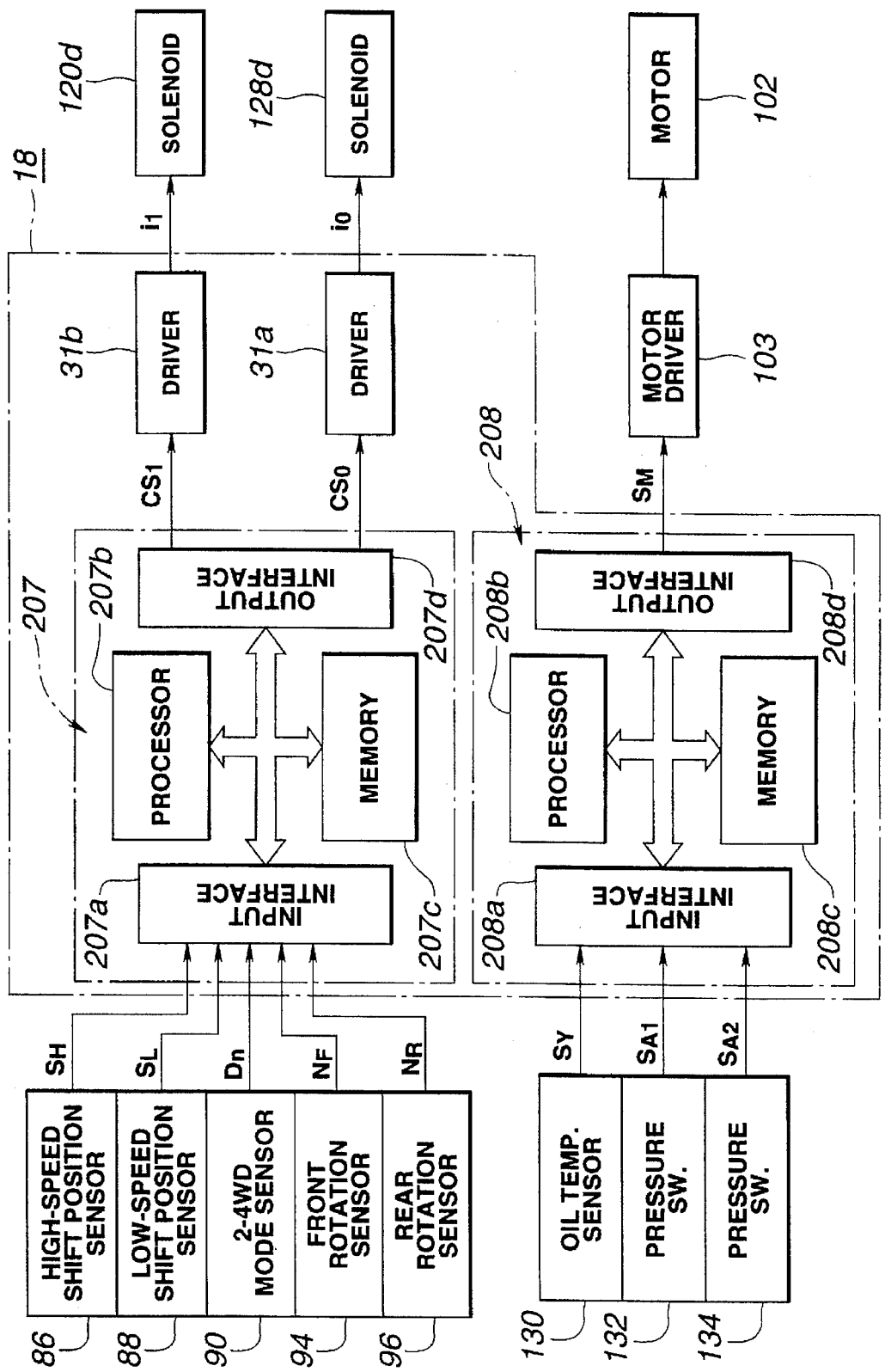
FIG. 7 is a block diagram which shows a control unit of the drive power transfer system according to the present invention.

As shown in FIG. 7, the control unit 18 comprises a first microcomputer 207 for executing a drive power distributing control and a second microcomputer 208 for executing a hydraulic pressure keeping control. The first microcomputer 207 outputs the control signal CS0 to a drive circuit 31a which supplies the exciting current $i_0$ corresponding to the desired duty ratio to the duty control electromagnetic valve 128 according to the control signal CS0. The first microcomputer 207 outputs a control signal CS1 to a drive circuit 31b which supplies the exciting current $i_1$ to the solenoid 120d of the electromagnetic selector valve 120 according to the control signal CS1. The second microcomputer 208 outputs a motor control signal SM to a motor drive circuit 103 which controls the rotation speed of the auxiliary motor 102 by the chopper control according to the motor control signal $S_M$.

The first microcomputer 207 comprises an input interface circuit 207a, a processor 207b, a memory 207c and an output interface circuit 207d which are electrically connected with each other. The input interface circuit 207a receives the detected signals $S_H$, $S_L$, Dn, NF and NR from the high-speed shift position sensor 86, the low-speed shift position sensor 88, the 2WD-4WD mode sensor 90, the front rotation sensor 94 and the rear rotation 96, then converts the detected signals to the corresponding digital signals by its A/D converting function. The processor 207b executes calculation and control processing of the drive power distributing control according to a predetermined programmed routine and the obtained data. The memory 207c is constituted by ROM and RAM. The output interface circuit 207d outputs the control signal CSo for commanding the duty ratio D indicative of the clutch pressure Pc obtained in the processor 207b to the drive circuit 31a. Further, the output interface circuit 207d outputs the control signal CS1 indicative whether the clutch pressure Pc is outputted or not is supplied to the drive circuit 31b.

The second microcomputer 208 comprises an input interface circuit 208a, a processor 208b, a memory 208c and an output interface circuit 208d which are electrically connected with each other. The input interface circuit 208a receives the detected signals $S_Y$, $S_{A1}$ and $S_{A2}$ from the oil temperature sensor 130, the oil pressure sensor 132 and the oil pressure sensor 134, and converts the detected signals to the corresponding digital signals. The output interface circuit 208d outputs a command value for commanding the rotation speed of the auxiliary motor 102, such as an analog voltage signal $S_M$ to the motor drive circuit 103.

The first microcomputer 207 determines a command value $T_2$ indicative of the power distribution to the front wheels according to the mode signal Dn from the 2WD–4WD mode sensor 90, the detected signal $S_H$ from the high-speed shift position sensor 86, and the detected signal $S_L$ from the low speed shift position sensor 88, and calculates the duty ratio D for generating the clutch pressure $P_C$ corresponding to the command value $T_2$. The first microcomputer 207 also determines a front and rear wheel speed difference ΔN from the sensed front and rear wheel speeds NF and NR. Further, the first microcomputer 207 outputs the control signal $CS_0$ corresponding to the duty ratio D to the drive circuit 31a. Simultaneously, the first microcomputer 207 outputs a control signal CS1 to the drive circuit 31b upon controlling the signal into on-state or off-state.

The drive circuit 31a is provided with a pulse-width modulating circuit which modulates the received control signal CSo to the exciting current $i_0$ corresponding to the duty ratio D. The drive circuit 31a outputs the modulated exciting current $i_0$ to the solenoid 128d of the duty control valve 128.

The drive circuit 31b converts the control signal $CS_1$ into the exciting current $i_1$ by which the solenoid 120d of the electromagnetic selector valve 120 is excited, and outputs the converted exciting current $i_1$ to the solenoid 120d.

In this embodiment, the calculating processing is executed by the control unit 18. That is, the control for keeping the oil pressure at a predetermined value in the hydraulic power supply apparatus is executed such that when the oil pressure switch 132 detects that the line pressure $P_L$ at the combined conduit 110a downstream of the oil element 112 is lower than the preset value, the control unit 18 controls the discharge pressure from the auxiliary pump 104. More particularly, by calculating the control signal $S_M$ indicative of the command value of the rotation speed set according to the detected oil temperature $S_Y$ and by supplying the signal $S_M$ to the motor drive circuit 103, the rotation speed of the auxiliary motor 102 is controlled to keep the line pressure $P_L$ at a predetermined value.

Figure 8:
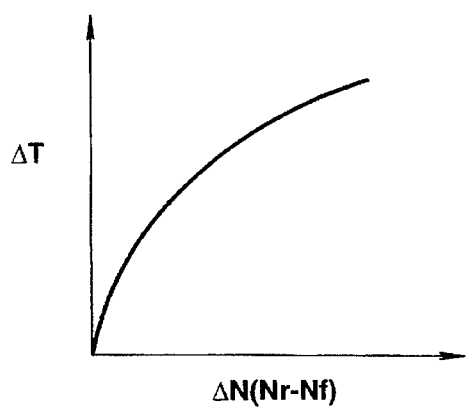
FIG. 8 is a graph which shows a relationship between a front and rear speed difference and a distributed front drive power.
Figure 9:
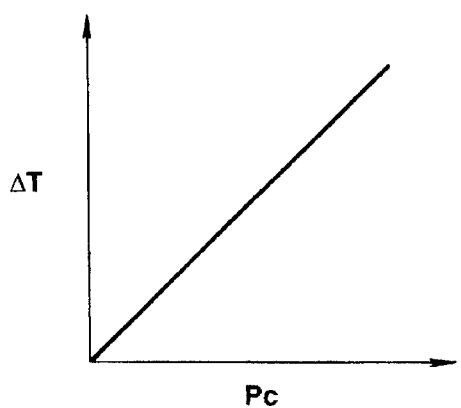
FIG. 9 is a graph which shows a relationship between a clutch pressure and the drive torque.
Figure 10:
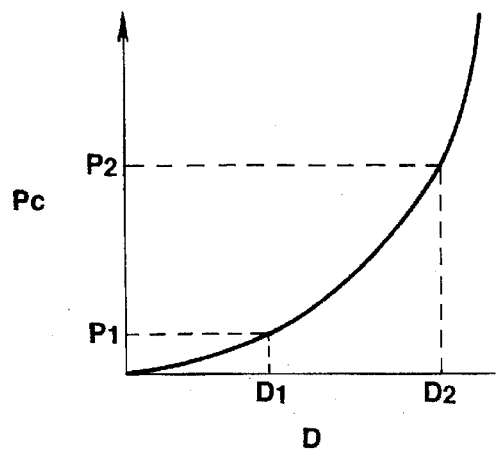
FIG. 10 is a graph which shows a relationship between a duty ratio and the clutch pressure.

The memory 207c previously stores programs and data necessary for the processing at the processor 207b and temporally stores the result of the processing. The data stored in the memory 207c includes tables representative of the relationships as shown in FIGS. 8 to 10. FIG. 8 shows a relationship between the rotation speed difference ΔN= (NR–NF) and the transfer torque ΔT where the transfer torque ΔT is non-linearly increased according to the increase of the rotation speed difference ΔN. FIG. 9 shows a relationship between the clutch pressure $P_C$ and the transfer torque ΔT where the transfer torque ΔT is linearly increased according to the increase of the clutch pressure Pc. FIG. 10 shows a relationship between the duty ratio D and the clutch pressure Pc where the clutch pressure of the valve 122 is non-linearly increased according to the increase of the duty ratio D to form a parabolic curve.

The first microcomputer 207 determines the transfer torque ΔT from the front and rear rotation speed difference ΔN and the table corresponding to the characteristic curve shown in FIG. 8, and further determines the duty ratio D on the basis of the determined transfer torque ΔT and the tables corresponding to the characteristic curves shown in FIGS. 9 and 10. When the clutch pressure $P_C$ ranging from P1–P2 corresponding to a range of the duty ratio D within D1–D2 is supplied to the friction clutch 66, the friction clutch 66 is engaged so as to distribute the drive power with a torque distribution ratio from R.W.(rear wheel): F.W.(front wheel) =100%:0% to R.W.:F.W.=50%:50%. That is, the torque distribution ratio is continuously changed from 1:0 to 0.5:0.5 according to the change of the clutch pressure Pc.

Next, the operation of the transfer 22 and the vehicle traveling condition thereby according the range selection of the auxiliary transmission lever will be discussed hereinafter.

The auxiliary transmission lever can select a rear 2WD high-speed range (2H range), a 4WD high-speed range (4H range), a neutral range (N range) and a 4WD low-speed range (4L range). When the 4L range or 4H range is selected, the 2WD–4WD mode sensor 90 outputs a mode signal Dn indicative that the 4L range or 4H range is selected, to the control unit 18.

When the N range is selected, the shift sleeve 64b is slid to a neutral position N designated by a two-dots chain line in the upper portion of FIG. 4. In this case, the shift sleeve 64b is engaged with none of the high-speed shift gear 64c, the low-speed shift gear 64d and the 4WD gear 80, and therefore none of the front and rear wheels is driven.

When the 2H range is selected, the 2WD–4WD mode sensor 90 outputs the mode signal Dn indicative of the 2H range to the control unit 18. In reply to the mode signal indicative of the 2H range, the control unit 18 cancels the hydraulic pressure supply control and therefore no clutch pressure Pc is supplied to transfer 22. The shift sleeve 64b is slid to the high-speed position H as shown by a continuous line in an upper side of FIG. 4 so that the inner teeth 64b1 are engaged with the high-speed shift gear 64c. Accordingly, the drive power of the input shaft 42 is transferred through the high-speed shift gear 64c and the inner teeth 64b1 to the first output shaft 44 as a high-speed drive power. Since the friction plates 66b and the friction discs 66d of the friction clutch 66 are not engaged, the drive power is not transferred to the second output shaft 54. Therefore, the vehicle is driven in a high-speed 2WD condition.

When the 4H range is selected, the control unit 18 receives the mode signal Dn indicative of the 4WD mode from the 2WD–4WD mode sensor 90, and outputs a control signal CSo corresponding to a command value according to the duty ratio range D1–D2 to the solenoid 128d of the duty control electromagnetic valve 128 to control the clutch pressure control valve 122. According to the control signal CSo to the solenoid 128d, the clutch pressure control valve 122 outputs the secondary pressure ranging from P1 to P2 to the input port 74 through the pilot selector valve 126 as a clutch pressure Pc. The drive power of the input shaft 42 is transferred through the high-speed shift gear 64 and the inner teeth 64b1 to the first output shaft 44 as a high-speed drive power. The high-speed drive power of the first output shaft 44 is transferred as a high-speed drive power to the second output shaft 54 through the friction clutch 66 engaged to generate a predetermined torque distribution ratio, the first sprocket 68, the endless chain 72 and the second sprocket 70. Therefore, the vehicle is set to the high-speed 4WD condition.

When the 4L range is selected, the shift sleeve 64b is slid to the low-speed position L shown in a lower part of FIG. 4. In this case, the low-speed gear 64d is engaged with the outer teeth 64b2, and simultaneously the 4WD gear 80 is engaged with the inner teeth 64b1.

As the rotation speed of the low-speed shift gear 64d is reduced by the planetary gear mechanism 62 with respect to that of the input shaft 42, the drive power of the input shaft 42 is transferred as a reduced-speed drive power to the first output shaft 44 through the inner teeth 64b1, the 4WD drive gear 80, the first sprocket 68, the endless chain 72 and the second sprocket 70. Therefore, the vehicle can take the low-speed 4WD condition.

Next, the advantages gained by the present invention will be discussed hereinafter with reference to FIG. 3.

When the predetermined clutch pressure Pc from the hydraulic power supply system 16 is supplied to the friction clutch 66, the clutch piston 66g and the rotation member 66e are moved in the left hand side in FIG. 3 due to the push force generated in the cylinder chamber 66h to generate a predetermined engagement force between the friction plates 66b and the friction discs 66e of the friction clutch 66. In every time when the clutch piston 66g and the rotation member 66e are moved, the first output shaft 44 receives a thrust reaction force F along the axial direction of the first output shaft 44.

The ring member 47 is inserted to the ring groove 45 formed at the outer periphery of the first output shaft 44 so that the side surface of the ball bearing 48 is in contact with the ring member 47. Accordingly, the thrust reaction force F inputted to the first output shaft 44 is transferred to the ball bearing 48 through the ring member 47. Since the outer race 48b of the ball bearing 48 is fixed at the inner wall of the rear casing 40b, the ball bearing 48 can receive the thrust reaction force F inputted to the first output shaft 44.

Further, in case that the first output shaft 44 is bent due to the extension of the endless chain 72, even if the thrust reaction force F is inputted to the first output shaft 44 according to the operation of the friction clutch 66 (the movement of the clutch piston 66g and the rotation member 66e), the ball bearing 48 does not receive an edge load. Therefore, the thrust reaction force receiving structure according to the present invention ensures a sufficient strength. In addition, it becomes possible to receive the thrust reaction force F by the easy installation of the ring member 47 at a side surface of the ball bearing 48.

With the thus arranged drive power transfer system according to the present invention, even when a thrust reaction force is inputted to the first output shaft 44 by the operation of the friction clutch 66 so that the thrust reaction force is transferred to the ball bearing 48 through the reaction force transfer section 45 and 47, the thrust reaction force is securely received by the ball bearing 48 fixed with the casing wall of the rear casing 40b. Further, even when the first output shaft 44 is bent due to the extension of the endless chain 72 and receives the thrust reaction force due to the operation of the friction clutch 66, no edge-load is applied to the ball bearing. This remarkably improves the reliability of the structure for receiving the thrust reaction force in the power transfer system according to the present invention.

While the described embodiment represents the preferred form of the present invention, it is to be understood that modifications will occur to those skilled in that art without departing from the spirit of the invention. The scope of the invention is therefore to be determined solely by the appended claims.

What is claimed is:

1. A power transfer system for a vehicle, comprising:
   an input shaft connected to a drive power generating source;
   a first output shaft coaxially arranged with said input shaft, one end portion of said first output shaft being in butt connection with said input shaft, an opposite end portion of said first output shaft being rotatably supported to a housing through a ball bearing;
   a second output shaft parallel with said first output shaft;
   an endless chain interconnecting said first output shaft and said second output shaft;
   a multi-plate friction clutch disposed between the first output shaft and said endless chain, said friction clutch variably changing the engagement between said first output shaft and said endless chain according to a clutch pressure supplied to said friction clutch; and
   a reaction force transfer means installed to said first output shaft, said reaction force transfer means transferring a thrust load generated at said first output shaft by the operation of said friction clutch to the ball bearing.

2. A power transfer system as claimed in claim 1, wherein said reaction force transfer means comprises a means defining a ring groove formed at a portion of the outer periphery of said first output shaft and a ring member positioned in the ring groove in contact with a side surface of said ball bearing.

3. A power transfer system as claimed in claim 2, wherein the ring member is installed such that an inner circular portion of the ring member is inserted into the ring groove of said first input shaft, and one flat side surface of the ring member is in contact with the side surface of an inner race of the ball bearing.

4. A power transfer system as claimed in claim 2, wherein the ball bearing installed to the housing receives thrust load applied to the first input shaft through the ring member such that the thrust load is equivalently applied to the ball bearing.

5. A power transfer system as claimed in claim 1, further comprising a clutch control means which controls the degree of the engagement of the friction clutch according to a vehicle condition.

6. A power transfer system as claimed in claim 5, comprises a high-speed position sensor, a low-speed position sensor, a 2WD–4WD mode sensor, oil temperature sensor, a pressure sensor for a hydraulic system, a front wheel rotation sensor, and a rear wheel rotation sensor for detecting the vehicle condition.

* * * * *